(12) United States Patent
Laage et al.

(10) Patent No.: US 6,931,382 B2
(45) Date of Patent: Aug. 16, 2005

(54) PAYMENT INSTRUMENT AUTHORIZATION TECHNIQUE

(75) Inventors: Dominic P. Laage, San Francisco, CA (US); Maria T. Laage, San Francisco, CA (US)

(73) Assignee: CDCK Corporation, San Francisco, CA (US)

( * ) Notice: Subject to any disclaimer, the term of this patent is extended or adjusted under 35 U.S.C. 154(b) by 584 days.

(21) Appl. No.: 09/791,387

(22) Filed: Feb. 23, 2001

(65) Prior Publication Data

US 2002/0138445 A1 Sep. 26, 2002

Related U.S. Application Data

(60) Provisional application No. 60/263,818, filed on Jan. 24, 2001.

(51) Int. Cl.[7] ............................................. G06F 17/60
(52) U.S. Cl. ........................... 705/67; 705/64; 705/65; 705/66; 705/75; 705/77; 705/78; 713/202
(58) Field of Search ....................... 705/64–80; 713/202

(56) References Cited

U.S. PATENT DOCUMENTS

| | | | | |
|---|---|---|---|---|
| 5,756,978 | A | 5/1998 | Soltesz et al. | 235/380 |
| 5,771,291 | A | 6/1998 | Newton et al. | 380/25 |
| 5,774,546 | A | 6/1998 | Handelman et al. | 380/4 |
| 5,878,134 | A | 3/1999 | Handelman et al. | 380/4 |
| 5,915,093 | A | 6/1999 | Berlin et al. | 395/200.49 |
| 5,982,736 | A | 11/1999 | Pierson | 369/273 |
| 6,061,799 | A | 5/2000 | Eldridge et al. | 713/202 |
| 6,094,721 | A | 7/2000 | Eldridge et al. | 713/168 |
| 6,098,053 | A | * 8/2000 | Slater | 705/44 |
| 2001/0029496 | A1 | * 10/2001 | Otto et al. | 705/74 |
| 2001/0042051 | A1 | * 11/2001 | Barrett et al. | 705/65 |
| 2002/0035539 | A1 | * 3/2002 | O'Connell | 705/39 |
| 2003/0115151 | A1 | * 6/2003 | Wheeler et al. | 705/64 |

FOREIGN PATENT DOCUMENTS

| | | |
|---|---|---|
| WO | WO 99/22340 | 5/1999 |
| WO | WO 99/60506 | 11/1999 |
| WO | WO 00/07140 | 2/2000 |
| WO | WO 00/42605 | 7/2000 |
| WO | WO 00/62249 | 10/2000 |
| WO | WO 00/68868 | 11/2000 |

* cited by examiner

*Primary Examiner*—James P. Trammell
*Assistant Examiner*—Jalatee Worjloh
(74) *Attorney, Agent, or Firm*—Fitzpatrick, Cella Harper & Scinto

(57) ABSTRACT

A method is provided for protecting a payment instrument in non-face-to-face transactions. The payment instrument is issued by an issuing entity and associated with an authorized instrument holder. The authorized instrument holder is subject to authentication by a trusted third party with whom the payment instrument holder has previously registered. The method includes: the authorized instrument holder communicating with the issuing entity to block, on a default basis, authorization of the payment instrument for non-face-to-face transactions unless authorized to unblock the payment instrument by the trusted third party; prior to a non-face-to-face transaction, the authorized instrument holder communicating with the trusted third party to subject him or herself to authentication and to request that the payment instrument be unblocked; and the trusted third party authenticating the authorized instrument holder, and if the authentication result is positive, communicating with the issuing entity to request unblocking of the payment instrument.

10 Claims, 16 Drawing Sheets

When the merchant asks for an authorization, he gives:
- The merchant ID.
- The order number.
- The order amount and the currency.
- The credit card number and the expiration date.

Move space to xmlt-pos-ack (signal used when transmitting data from satellite server to main server)
Move space to no-match-ind (signal used to indicate to issuing card company that no user authorization match was found)

The algorithm is the following:
Find an exact match based on:
"The credit card number" = ttp-unblock-card-no and
"The merchant ID" = ttp-merchant-id and
"the order number" = ttp-order-no and
"The order amount" <= ttp-spec-user-author-amount and
"The order amount" <= ttp-single-unused-author-amount
- sort oldest unmatched authorization to newest.

Case 1
When one match found,
    Subtract "The order amount" from ttp-single-unused-author-amount.
    Compute ttp-matched-amount = ttp-spec-user-author-amount - ttp-single-unused-author-amount
    If ttp-matched-amount = > ttp-spec-user-author-amount
        Move 'y' to ttp-single-match-ind
    end
    Perform Notify-user-of-match-found-1.
    Go to Match-Exit.

When several matches are found (tag the oldest ttp-unblock-record),
    Use the oldest ttp-unblock-record.
    Subtract "The order amount" from ttp-single-unused-author-amount.
    Compute ttp-matched-amount = ttp-spec-user-author-amount - ttp-single-unused-author-amount.
    If ttp-matched-amount = > ttp-spec-user-author-amount
        Move 'y' to ttp-single-match-ind
    end
    Perform Notify-user-of-match-found-2.
    Go to Match-Exit.

End (Case 1)

FIG. 3B-1

Find an exact match on:
"The credit card number" = ttp-unblock-card-no and,
"The order number" = ttp-order-no and
"The order amount" < = ttp-spec-user-author-amount and
"The order amount" < = ttp-single-unused-author-amount
- sort oldest unmatched authorization to newest For each row found:
Case 2
When one match found
    Subtract "The order amount" from ttp-single-unused-author-amount.
    Compute ttp-matched-amount = ttp-spec-user-author-amount – ttp-single-unused-author-amount
    If ttp-matched-amount < = > ttp-spec-user-author-amount
        Move 'y' to ttp-single-match-ind
    end
    Perform Notify-user-of-match-found-1.
    Go to Match-Exit.

When several matches are found (tag the oldest ttp-unblock-record),
    Look for the closest match to "The merchant ID". If no fuzzy match found, take the oldest unblock-record found.
    Subtract "The order amount" from ttp-single-unused-author-amount.
    Compute ttp-matched-amount = ttp-spec-user-author-amount – ttp-single-unused-author-amount
    If ttp-matched-amount < = > ttp-spec-user-author-amount
        Move 'y' to ttp-single-match-ind
    end
    Perform Notify-user-of-match-found-3.
    Go to Match-Exit.
End (Case 2)

FIG. 3B-2

```
Find an exact match on:
"The credit card number" = ttp-unblock-card-no and,
"The merchant id" = ttp-merchant-id and
"The order amount" < = ttp-spec-user-author-amount and
"The order amount" < = ttp-single-unused-author-amount
- sort oldest unmatched authorization to newest For each row found:
Case 3
When one match found
   Subtract "The order amount" from ttp-single-unused-author-amount.
   Compute ttp-matched-amount = ttp-spec-user-author-amount - ttp-single-unused-author-amount
   If ttp-matched-amount = > ttp-spec-user-author-amount
       Move 'y' to ttp-single-match-ind
   end
   Perform Notify-user-of-match-found-1.
   Go to Match-Exit.

When several matches are found (tag the oldest ttp-unblock-record),
   Look for the closest match to "The order number". If no fuzzy match found, take the oldest unblock-record found.
   Subtract "The order amount" from ttp-single-unused-author-amount.
   Compute ttp-matched-amount = ttp-spec-user-author-amount - ttp-single-unused-author-amount
   If ttp-matched-amount = > ttp-spec-user-author-amount
       Move 'y' to ttp-single-match-ind
   end
   Perform Notify-user-of-match-found-4.
   Go to Match-Exit.
End (Case 3)

Ttp-group-unblock-record
   Ttp-group-card-no                    payment instrument acct no.
   Ttp-group-user-author-amount         total of user-author-amount from all ttp-unblock-records carrying
                                        The same payment instrument acct no., no merchant id, no order no
   Ttp-group-user-max-author-amount     total of user-max-author-amount from all ttp-unblock-record carrying
                                        The same payment instrument acct no., no merchant id, no order no
   Ttp-group-unused-author-amount       total of unused-author-amount from all ttp-unblock-record carrying
                                        The same payment instrument acct no, no merchant id, no order no
   Ttp-group-match-ind                  Indicator that signals if the whole group has been used/matched
```

FIG. 3B-3

```
Find an exact match on:
"The credit card number" = ttp-unblock-card-no and,
ttp-merchant-id = spaces and
ttp-order-no = spaces
sort oldest unmatched authorization to newest
If one or more ttp-unblock-records found,
    Get ttp-group-unblock-record (based on payment instrument - ttp-unblock-card-no)
End For each row found:
Case 4
When one match found and "the order amount" < = ttp-group-unused-author-amount and ttp-group-match-ind not = 'Y'
    Subtract "The order amount" from ttp-group-unused-author-amount.
    Compute ttp-group-matched-amount = ttp-group-user-author-amount - ttp-group-unused-author-amount
    If ttp-group-matched-amount = > ttp-group-user-author-amount
        Move 'Y' to ttp-group-match-ind
    end
    Perform Notify-user-of-match-found-5.
    Go to Match-Exit.

When several matches are found and "the order amount" < = ttp-group-unused-author-amount and ttp-group-match-ind not = 'Y'
    Subtract "The order amount" from ttp-group-unused-author-amount.
    Compute ttp-group-matched-amount = ttp-group-user-author-amount - ttp-group-unused-author-amount
    If ttp-group-matched-amount = > ttp-group-user-author-amount
        Move 'Y' to ttp-group-match-ind
    end
    Perform Notify-user-of-match-found-6.
    Go to Match-Exit.

When several matches are found and "the order amount" > ttp-group-unused-author-amount and ttp-group-match-ind not = 'Y'
    Subtract "The order amount" from ttp-group-unused-author-amount.
    Compute ttp-group-matched-amount = ttp-group-user-author-amount - ttp-group-unused-author-amount
    If ttp-group-matched-amount = < ttp-group-user-max-author-amount
        Move 'Y' to ttp-group-match-ind
    end
    Perform Notify-user-of-match-found-7.
    Go to Match-Exit.

When other
    Perform Notify-user-of-no-match-found.
    Move 'Y' to No-match-ind.
    Go to Match-Exit End (Case 4)
```

FIG. 3B-4

```
Match-Exit.

If xmit-pos-ack = 'y'
    Syncpoint

If no-match-Ind = 'n'
        Send negative message to issuing card company
    Else
        Send positive message to issuing card company
    End Else
    Rollback
    Send try-again message to issuing card company End
```

FIG. 3B-5

Notify-user-of-match-found-1.
　　Extract merchant request record (specifically request for authorization amount, order number, merchant name/id, auth code, date, time)
　　Store the merchant authorization request record into the TTP satellite server.
　　Send a copy of the ttp-unblock-record to the TTP main server.
　　Send a copy of the merchant authorization request record to the TTP main server.
　　Wait for positive acknowledgment.
　　If positive acknowledgment
　　　　Set xmit-pos-ack to 'y'
　　Else
　　　　Set xmit-pos-ack to 'n'
　　End.

Notify-user-of-match-found-2.
　　Extract merchant request record (specifically request for authorization amount, order number, merchant name/id, auth code, date, time)
　　Store the merchant authorization request record into the TTP satellite server.
　　Send a copy of the ttp-unblock-record to the TTP main server.
　　Send a copy of the merchant authorization request record to the TTP main server.
　　Send a reconciliation-needed-reason-2 message to the TTP main server.
　　Wait for positive acknowledgment.
　　If positive acknowledgment
　　　　Set xmit-pos-ack to 'y'
　　Else
　　　　Set xmit-pos-ack to 'n'
　　End.

Notify-user-of-match-found-3.
　　Extract merchant request record (specifically request for authorization amount, order number, merchant name/id, auth code, date, time)
　　Store the merchant authorization request record into the TTP satellite server.
　　Send a copy of the ttp-unblock-record to the TTP main server.
　　Send a copy of the merchant authorization request record to the TTP main server.
　　Send a reconciliation-needed-reason-3 message to the TTP main server.
　　Wait for positive acknowledgment.
　　If positive acknowledgment
　　　　Set xmit-pos-ack to 'y'
　　Else
　　　　Set xmit-pos-ack to 'n'
　　End.

FIG. 3B-6

Notify-user-of-match-found-4.
    Extract merchant request record (specifically request for authorization amount, order number, merchant name/id, auth code, date, time)
    Store the merchant authorization request record into the TTP satellite server.
    Send a copy of the ttp-unblock-record to the TTP main server.
    Send a copy of the merchant authorization request record to the TTP main server.
    Send a reconciliation-needed-reason-4 message to the TTP main server.
    Wait for positive acknowledgment.
    If positive acknowledgment
        Set xmit-pos-ack to 'y'
    Else
        Set xmit-pos-ack to 'n'
    End.

Notify-user-of-match-found-5.
    Extract merchant request record (specifically request for authorization amount, order number, merchant name/id, auth code, date, time)
    Store the merchant authorization request record into the TTP satellite server.
    Send a copy of the ttp-unblock-record to the TTP main server.
    Send a copy of the merchant authorization request record to the TTP main server.
    Send a reconciliation-needed-reason-5 message to the TTP main server.
    Wait for positive acknowledgment.
    If positive acknowledgment
        Set xmit-pos-ack to 'y'
    Else
        Set xmit-pos-ack to 'n'
    End.

Notify-user-of-match-found-6.
    Extract merchant request record (specifically request for authorization amount, order number, merchant name/id, auth code, date, time)
    Store the merchant authorization request record into the TTP satellite server.
    Send a copy of the ttp-unblock-record to the TTP main server.
    Send a copy of the merchant authorization request record to the TTP main server.
    Send a reconciliation-needed-reason-6 message to the TTP main server.
    Wait for positive acknowledgment.
    If positive acknowledgment
        Set xmit-pos-ack to 'y'
    Else
        Set xmit-pos-ack to 'n'
    End.

FIG. 3B-7

Notify-user-of-match-found-7.
Extract merchant request record (specifically request for authorization amount, order number, merchant name/id, auth code, date, time)
Store the merchant authorization request record into the TTP satellite server.
Send a copy of the ttp-unblock-record to the TTP main server.
Send a copy of the merchant authorization request record to the TTP main server.
Send a reconciliation-needed-reason-7 message to the TTP main server.
Wait for positive acknowledgment.
If positive acknowledgment
    Set xmit-pos-ack to 'y'
Else
    Set xmit-pos-ack to 'n'
End.

Notify-user-of-no-match-found.
Extract merchant request record (specifically request for authorization amount, order number, merchant name/id, auth code, date, time)
Store the merchant authorization request record into the TTP satellite server.
Send a copy of the merchant authorization request record to the TTP main server.
Send a merchant-author-not-matched message to the TTP main server.
Wait for positive acknowledgment.
If positive acknowledgment
    Set xmit-pos-ack to 'y'
Else
    Set xmit-pos-ack to 'n'
End.

FIG. 3B-8

PAYMENT INSTRUMENT AUTHORIZATION TECHNIQUE

CROSS REFERENCE TO RELATED APPLICATION

This application claims benefit of U.S. Provisional Application No. 60/263,818, filed Jan. 24, 2001, which is hereby incorporated by reference.

BACKGROUND OF THE INVENTION

1. Field of the Invention

The present invention relates to systems and methods of (1) allowing the legitimate holder of a payment instrument to explicitly control the precise conditions under which a payment authorization request against that instrument may be granted or rejected by the financial institution (the instrument issuer) on behalf of the instrument holder, and (2) authenticating payments made using payment instruments, and in particular a system and method for allowing instrument issuers and merchants to ensure that a the payment instrument user is the actual and legitimate holder of that instrument.

2. Description of the Related Art

The recent expansion of commerce on the World Wide Web has added a new source of sales for many established businesses, and has provided new business opportunities for online vending even for companies without a brick and mortar presence. While the Web has provided new opportunities for sales, online shopping has also made it necessary for online merchants to find ways of providing secure methods of obtaining payment from their customers.

One such method is the use of one time use numbers. One time use credit card numbers (a.k.a. Surrogate numbers) are single use credit card account numbers that are generated by the card issuer to the cardholder at the time of an on-line transaction. The single use card number is then transmitted to the merchant by the card holder. The payment authorization/settlement is routed to the acquiring bank and the issuing bank as if it was the real number. The main disadvantages of the one time use credit card numbers are: (1) They do not prevent unauthorized use of the "real" credit card account for neither for "card present" nor "card not present" transactions. (2) They complicate and lengthen the on-line purchase process with merchant sites that require the buyer to store payment information in a merchant wallet (i.e. Amazon.com and Expedia.com). (3) They typically cannot be used for recurring transactions or "signature on file" purchases.

From the point of view of the shopper, online shopping eliminates much of the stress associated with physical shopping. Moreover, online prices are generally lower than prices offered by physical retail merchants. Shopping via the Web has been in existence for a number of years. Shopping by Mail order and Telephone order has been in existence even before the advent of Internet.

The proliferation of various online merchants necessitated the installation of various payment processes. Most of these payment processes require the input of information relating to a payment instrument, such as a credit card, charge card or debit card. Various secure techniques have been developed for securely transmitting this information to the merchant server. For example, the use of Secure Sockets Layer (SSL) protects data being sent across a network.

SmartCard (chip) based payment system architecture based on the SET and 3DSET protocol theoretically offer transmission security, user privacy, strong user authentication, non-repudiation using digital certificate/digital signature. However, these systems require massive investment to the payment processing infrastructure ($11 billion in the U.S alone) and are not expected to be widely accepted and deployed until several years.

However, once at the server, this sensitive financial data is routinely stored in database servers by the online merchants. Moreover, in certain well-publicized instances, hackers have retrieved this kind of data from online merchants servers. It is not unusual for hackers to blackmail and demand the payment of ransom money for this data. There have been cases where the hacker publishes the data when the ransom money is not paid. This has bred insecurity and fear in payment instrument owners. Online merchants also lose credibility in the eyes of their current and potential customers when this type of incident occurs.

Thus, while the Web has provided new opportunities for sales to merchants, as well as added convenience and value for purchasers, incidents such as those discussed above have also made it necessary for online merchants to find ways of providing secure methods of obtaining payment from their customers.

In addition, special considerations must be taken into account when credit cards are used in online transactions. Banks have instituted a classification of payment by card: card present and card not present. Card not present transactions usually incur a higher transaction fee. It is common practice in the United States that any transaction reported by the payment instrument owner as fraudulent is automatically "charged back" to the online Merchant. Such is also the case in Europe. However, since most Europeans use credit lines associated to their debit accounts with banks, the amounts are automatically debited from the accounts. For this reason, it is common for an unauthorized usage to be detected only after the card holder receives a monthly bank statement. In Europe, it is also more the burden of the payment instrument owner to prove the unauthorized usage of his or her payment instrument.

In view of the above, an online merchant must be concerned with receiving payment for goods purchased online. When credit cards are used to pay for a transaction, the possibility exists that someone other than the authorized user of the card is using the credit card information fraudulently makes a purchase fraudulently. This is a problem for a merchant since goods may have been shipped before the fraud is discovered and, as discussed above, the legitimate cardholder is not liable for such use over $50.00.

Another problem facing merchants is the phenomenon of cardholders placing orders and then instructing their issuing bank not to pay, claiming that the transaction was never made. In a card present, or face-to-face transaction, the merchant can display a copy of the cardholder's signature to prove that the purchase was actually made. However, in a card not present (non-face-to-face) online transactions there is no signature, thus making it easier for a cardholder to back out of a transaction.

Cardholders themselves may be concerned with unauthorized use of their credit cards in the online context. In particular, because signatures are not required in card transactions on the Web, a concern exists that their card numbers will be stolen and used for unauthorized purchases.

Thus there exists a need to provide a system and method for providing assurance to the merchant that the person attempting to make a purchase with a payment instrument is in fact the authorized user of the instrument. There also exists a need for a system and method that allows a merchant to prove that the authorized cardholder actually made the transaction. There also exists a need for a system and method for reducing the likelihood of a cardholder's issuing bank authorizing a fraudulent online transaction.

SUMMARY OF THE INVENTION

In consideration of the above deficiencies of the prior art, the present invention provides a process by which owners of payment instruments may have control over the usage of their payment instruments by giving them the ability selectively to block and unblock their payment instruments. It also provides a technique for strongly authenticating the owner of the payment instruments. In particular, there is provided a system and method for assuring that only an authorized user of a payment instrument makes online transactions. By virtue of the techniques and processes of the present invention, the security and privacy concerns of payment instrument owners as well as those of merchants are addressed.

The subject invention is a system made up of various processes that may be used to eliminate fraudulent payment transactions. The secure authorization provided by the present invention is not limited to credit/debit card accounts. This secured payment system can be used with virtual bank accounts/vault accounts, bank accounts, gift certificate accounts, loyalty/reward accounts, credit and debit card accounts.

In accordance with one aspect of the present invention, there is provided a method of protecting a payment instrument in non-face-to-face transactions, the payment instrument being issued by an issuing entity and associated with an authorized instrument holder, the authorized instrument holder being subject to authentication by a trusted third party with whom the payment instrument holder has previously registered.

The method comprises: the authorized instrument holder communicating with the issuing entity to block, on a default basis, authorization of the payment instrument for non-face-to-face transactions unless authorized to unblock the payment instrument by the trusted third party; prior to a non-face-to-face transaction, the authorized instrument holder communicating with the trusted third party to subject him or herself to authentication and to request that the payment instrument be unblocked; and the trusted third party authenticating the authorized instrument holder, and if the authentication result is positive, communicating with the issuing entity to request unblocking of the payment instrument.

In accordance with another aspect of the present invention, there is provided a system for strongly authenticating that a customer attempting to effect a payment transaction with a merchant using a payment instrument is an authorized user of the payment instrument. The system comprises: a storage medium storing encrypted personal information relating to the customer and information relating to the payment instrument; and a trusted third party computer system adapted to: (a) receive requests from the customer to use the payment instrument in a transaction; (b) decrypt the stored personal and payment instrument data; and (c) authenticate the identity of the customer as an authorized user of the payment instrument by requesting input of personal information from among the stored personal information.

In accordance with still another aspect of the present invention, there is provided a system for selectively blocking and unblocking an issuing entity from authorizing, in accordance with a result of a process of authenticating a customer as an authorized user of a payment instrument, the use of the payment instrument in a non-face-to-face transaction with a merchant server over a network. The system comprises: a storage medium storing encrypted personal information relating to the customer and information relating to the payment instrument; and a trusted third party computer system adapted to: receive requests from the customer to unblock the use of the payment instrument in a transaction the merchant server; receive the stored encrypted personal and payment instrument information from the customer; decrypt the received personal and payment instrument data; authenticate the identity of the customer as an authorized user of the payment instrument by requesting that the customer input personal information from among the stored personal information and comparing the input personal information with the stored personal information that has been decrypted; and if the identity is authenticated, communicate with the issuing entity to unblock the use of the payment instrument for the transaction with the merchant server, and communicate with the merchant server to assure the merchant server that the customer is an authorized user of the payment instrument.

In accordance with yet another aspect of the present invention, there is provided a portable memory medium operable to be read by a client terminal of a customer, the portable memory medium having encryptively stored thereon identification and payment instrument information of the customer, the client terminal having software thereon operable to cause the client terminal to initiate communication over a network with at least one merchant Web site and a central server operated by a trusted third party; the central server being operable to decrypt the identification and payment instrument information and to authenticate the customer by requiring the customer to input identifying indicia corresponding to the stored identification information; and the central server, in response to receipt of correct identifying indicia, causing to display on the client terminal a virtual wallet. The virtual wallet allowing the customer to complete payment with a payment instrument from the wallet to the merchant Web site to effect payment of goods or services from the merchant.

In accordance with another aspect of the present invention, there is provided a method for strongly authenticating that a customer attempting to effect a payment transaction with a merchant using a payment instrument is an authorized user of the payment instrument. The method comprises: storing encrypted personal information relating to the customer and information relating to the payment instrument on a storage medium; providing the storage medium to the customer; receiving requests from the customer to use the payment instrument in a transaction; decrypting the stored personal and payment instrument data; and authenticating the identity of the customer as an authorized user of the payment instrument by requesting input of personal information from among the stored personal information.

In accordance with another aspect of the present invention, there is provided a system for strongly authenticating that a customer attempting to effect a payment transaction with a merchant using a payment instrument is an authorized user of the payment instrument. The system comprises: a portable storage medium in the possession of the customer, the portable storage medium storing encrypted personal information relating to the customer and information relating to the payment instrument and which cannot be decrypted by the customer; and a trusted third party computer system adapted to: (a) receive requests from the customer to use the payment instrument in a transaction; (b) decrypt the stored personal and payment instrument data; and (c) authenticate the identity of the customer as an authorized user of the payment instrument by requesting input of personal information from among the stored personal information.

BRIEF DESCRIPTION OF THE DRAWINGS

FIGS. 3A-1–3A-4 are sample graphical user interface (GUI) screens for the wallet program of the present invention;

FIGS. 3B-1–3B-8 list code for performing a matching procedure according to a preferred embodiment of the present application; and FIG. 4 is flow diagram illustrating an authentication procedure in accordance with a second embodiment of the present invention.

DETAILED DESCRIPTION OF THE PREFERRED EMBODIMENTS

Figure 1:
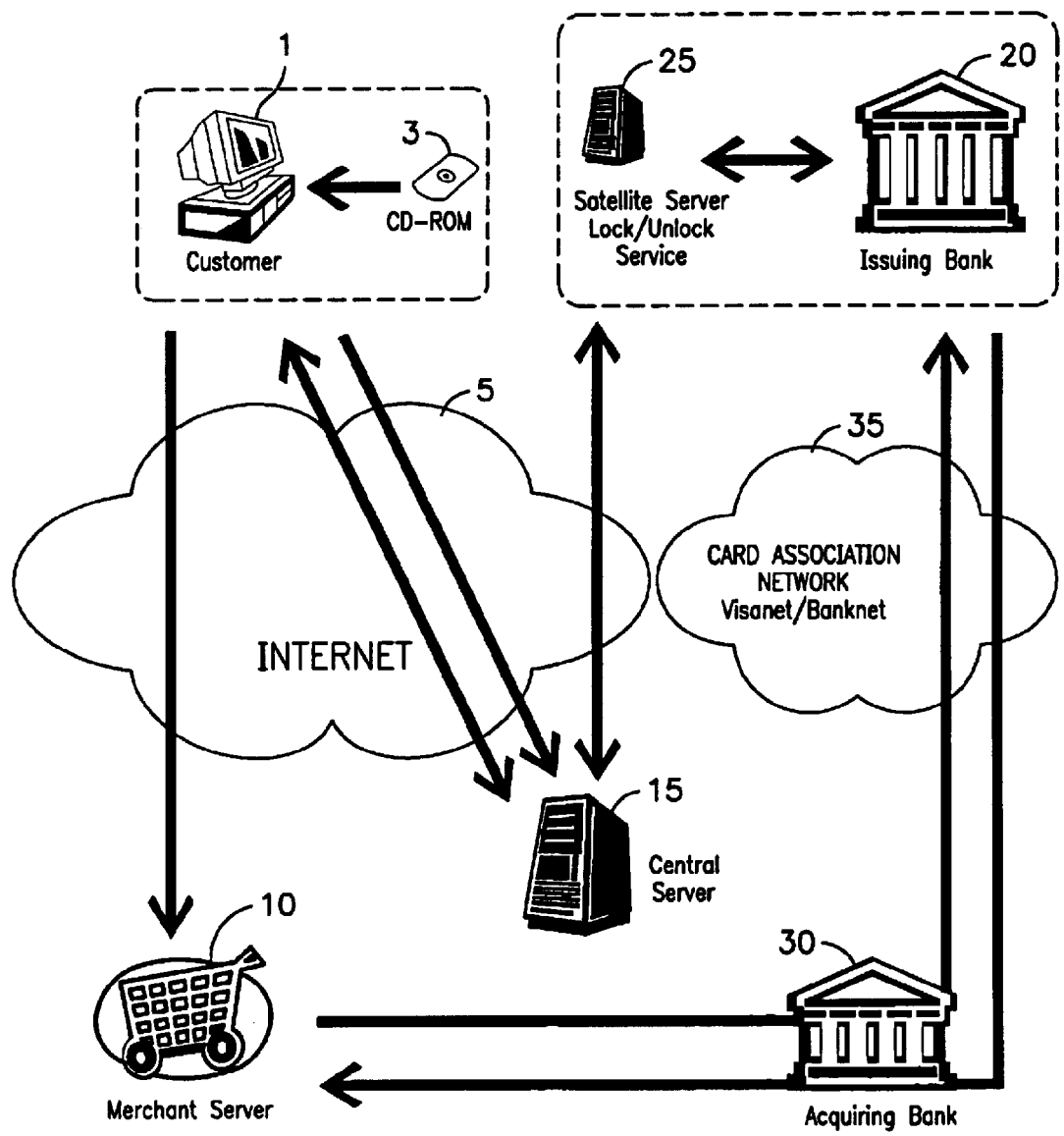
FIG. 1 is a diagram showing an exemplary network environment in which a preferred embodiment of the present invention operates.

"Computer" may refer to a single computer or to a system of interacting computers. Generally speaking, a computer is a combination of a hardware system, a software operating system and perhaps one or more software application programs. Examples of computers include, without limitation, IBM-type personal computers (PCs) having an operating system such as DOS, Windows, OX/2 or Linux; Macintosh computers; hardware having a JAVA-OS operating system; graphical work stations, such as Sun Microsystems and Silicon Graphics Workstations having a UNIX operating system; PalmPilots; and PilotPCs.

"Network" means a connection between any two or more computers, which permits the transmission of data. An example of a network is the Internet.

"Client/server" architecture is a network architecture in which each computer or process on the network is either a "client" or a "server". A "server" is a computer or device on a network that manages network resources and is operable to receive requests from third parties on the network and respond to those requests. A "client", typically an application that runs on a personal computer or workstation and relies on the server to perform some operations, sends requests to a server.

"Web page" means any documents written in mark-up language including, but not limited to, HTML (hypertext mark-up language) or VRML (virtual reality modeling language), dynamic HTML, XML (extended mark-up language) or related computer languages thereof, as well as to any collection of such documents reachable through one specific Internet address or at one specific Web site, or any document obtainable through a particular URL (Uniform Resource Locator).

"Web site" means at least one Web page, and preferably a plurality of Web pages, virtually connected to form a coherent group.

"Web browser" means any client software program running on a computer which can display text, graphics, or both, from Web pages on Web sites. Examples of Web browsers include, without limitation, Netscape Navigator and Microsoft Internet Explorer.

"Web server" is a server which is capable of serving at least one Web page to a Web browser.

The phrase "display a Web page" includes all actions necessary to render at least a portion of the information on the Web page available to the computer user. As such, the phrase includes, but is not limited to, the static visual display of static graphical information, the audible production of audio information, the animated visual display of animation and the visual display of video stream data.

For the present invention, a software application could be written in substantially any suitable programming language, which could easily be selected by one of ordinary skill in the art. The programming language chosen should be compatible with the computer by which the software application is executed, and in particular with the operating system of that computer. Examples of suitable programming languages include, but are not limited to, C, C++, CGI, Java and Java Scripts. Furthermore, the functions of the present invention, when described as a series of steps for a method, could be implemented as a series of software instructions for being operated by a data processor, such that the present invention could be implemented as software, firmware or hardware, or a combination thereof.

FIG. 1 is a diagram of an exemplary online environment that will be used to illustrate a preferred embodiment of the present invention as it operates, in relation to a large area network, such as the Internet, as well as dedicated network connections, between participants. Exemplary transactions according to preferred embodiments of the present invention will be illustrated in terms of the participants shown in FIG. 1. The figure also illustrates exemplary communication channels linking the various participants. In the illustrated embodiment, the user or customer 1 typically will be operating a personal computer (PC) or other workstation. Typically, the customer 1 can communicate over the Internet 5 with Web sites of merchants with which he or she wishes to do business. The figure shows an exemplary merchant Web server 10, which operates a merchant Web site. The customer's PC usually will have running thereon Web browser software, to enable the customer to download Web pages from Web sites, by, for example, sending Uniform Resource Locators (URLs), i.e., Web addresses, over the Internet 5.

The present invention provides a secure method of the customer 1 making credit, debit or charge card transactions. In the illustrated examples, the transactions to which the present invention will be applied include a communication between the customer 1 and a merchant server 10. Because of the advantageous security provisions of the invention, a credit card or other payment instrument, holder, such as customer 1, can authorize use of his or her card over the Internet, or other card not present transaction, without being concerned that an unauthorized user will make purchases with the card. Further, merchants can accept such cards as payment without being concerned that the transaction is a fraudulent one, since, for example, the merchant server 5 will receive assurance from a trusted third party that the customer is an authorized user of the card. This trusted third party (TTP) operates, in the preferred embodiments, a central Web server 15.

The preferred embodiments of the system and method of the present invention achieve the above security advantages, in accordance with one aspect of the present invention, by providing customer 1 with a portable information storage medium storing personal identifying information relating to the customer, as well as information relating to payment instruments, such as credit cards, or the like. In certain of the illustrated embodiments this information storage medium is a CD-ROM 3. The CD-ROM 3 preferably contains personal information as to the customer 1, as well as information as to selected ones of the customer's payment instruments. For convenience of use and storage, the CD-ROM 3 is preferably of a credit card shape.

The information stored on the CD-ROM 3 is encrypted, in accordance with a preferred embodiment, in a manner such that no computer system of any kind (or array of computers, local or remote) can decrypt the information off the CD-ROM 3 without: (a) knowledge of the encryption key and (b) access to highly specialized encryption hardware. Consequently, neither the payment instrument holder computer, nor any remotely connected computer system, can decrypt the information from CD-ROM 3. Advantageously, the CD-ROM 3 is preferably structured to allow the customer 1 to have information relating to several credit, charge and/or debit cards stored on the CD-ROM 3.

Issuing bank 20 is a bank that has issued one or more of the cards the information for which is stored on the CD-ROM 3. Issuing bank 20 has computer systems adapted to send and receive communications over the Internet 5, as well as over a card association network 35, such as Visanet or Bank net. Acquiring bank 30 is the merchant's bank and also operates computer systems adapted to communicate with other banks, such as the issuing bank 20, over network 35. In addition, the acquiring bank 30 is adapted to communicate over the Internet 5 with, among others, merchant server 10. Satellite server 25 is located at the issuing bank 20 and is associated with and administered by the same trusted third party that administers the central server 15. The presence of satellite server 25 adds functionality to the issuing bank 20's legacy computer system that allows the central server 15 to communicate, via the satellite server 25, with the issuing bank 20's legacy computer system with regard to selective blocking and unblocking of the use of those of customer 1's cards that were issued by issuing bank 20. Although for purposes of simplicity of explanation the figure only shows one issuing bank, it will be appreciated that other of the customer's cards to be associated with the wallet of the present invention may have other issuing banks. Those issuing banks each would be associated with their own satellite server and would function in the system of the present invention similarly to the illustrated issuing bank 20.

The CD-ROM 3 stores personal data, as well as data relating to the payment instruments selected by the customer 1. As a part of the authentication process of the present invention, the personal and payment instrument data preferably is encrypted using a known, highly secure, encryption method such as Triple DES.

Preferably, the encrypted data in the CD-ROM 3 may include, for example:

A CD-ROM ID
Credit card account No. 1
A "ghost" credit card account number 1, related to a credit card account No. 1
The name of the account holder of credit card account No. 1
The name of the account holder of ghost credit card account No. 1
Debit card account No. 2
A ghost debit card account No. 2, related to debit card account No. 2
The name of the account holder of debit card account No. 2
The name of the account holder of ghost debit card account No. 2
Bank account number—checking account
Virtual bank account number/account name
An encryption private key (used to generate an electronic signature)
The customer's Social Security number
The customer's drivers license number
The customer's passport number
The customer's birth date
The customer's mother's maiden (last) name In accordance with a preferred embodiment of the present invention, other personal data, such as shipping addresses, billing addresses, and card expiration dates, is stored in the central server 15.

The ghost account referred to above is a surrogate account generated by a financial institution that is directly associated with an existing credit or debit card account. It should be noted that a ghost account number is not a one time use only number. It may remain active and usable as long as the corresponding main card account is active.

Preferably, the ghost account will be issued only if requested by the existing card account owner. A ghost account may be correlated to a pseudonym chosen by the card account owner. The ghost account will also carry the same expiration date as the existing card account. Preferably, a ghost account should be used only for card not present transactions, and a physical card cannot and should not be generated with the ghost account number. The concept of a ghost account, also known as a virtual credit card account number, has been previously utilized by a company called TRINTECH, which is selling solutions based on permanent virtual credit card account technology.

Implementation of ghost accounts depends on operating agreements with issuing card companies or other financial institutions. Offering of ghost accounts is not necessary to implement the secured payment system of the present invention, although it is recommended.

The encryption on the CD-ROM 3 should be as secure as possible. Thus, it is preferable to use Triple DES, a standard promulgated by the National Institute of Standards and Technology (NIST), Commerce. The Data Encryption Standard (DES) provides specifications for the Data Encryption Algorithm and is used by federal agencies (and others outside the government) for the protection of sensitive information. This standard, first issued in 1977, is reviewed every five years. The DES, currently specified in Federal Information Processing Standard (FIPS) 46-2, is due for review in December 1998. NIST is proposing to replace FIPS 46-2 with FIPS 46-3 to provide for the use of Triple DES as specified in the American National Standards Institute (ANSI) X9.52 standard. Comments are sought from industry, government agencies, and the public on the draft of FIPS 46-3.

The present invention advantageously includes a process allowing the payment instrument holder to request, at registration time, that the payment instrument issuer systematically block the use of the payment instrument for all card not present payment authorization transactions unless the payment holder explicitly unblocks the payment instrument before each card not present transaction.

Further, if a ghost account is utilized, then any card present payment authorization transaction using a ghost account number will be automatically blocked. A ghost account owner may also subscribe to block card not present payments.

Figure 2:
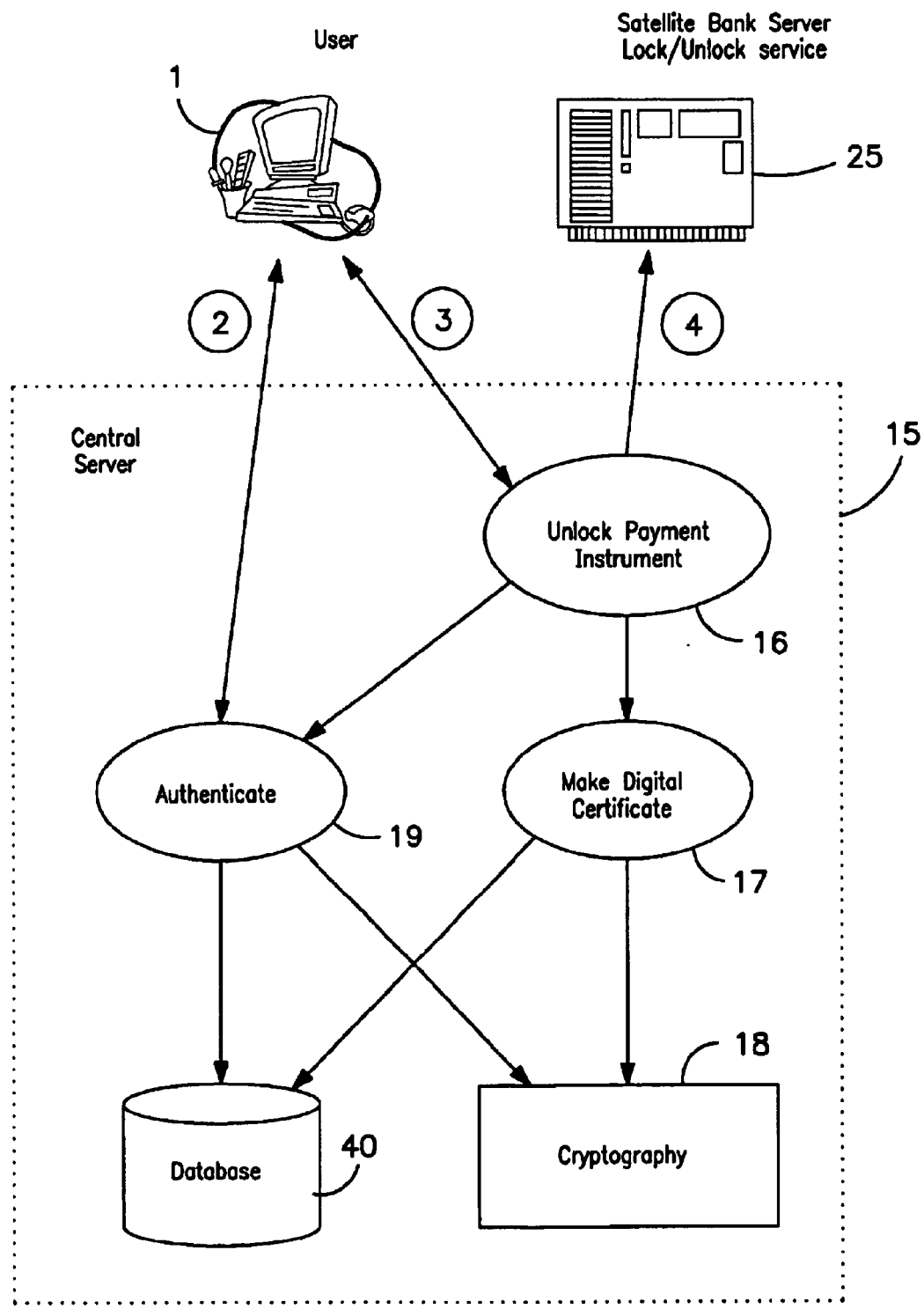
FIG. 2 is a diagram illustrating the functionality and connectivity of a central server in accordance with a preferred embodiment of the present invention.

FIG. 2 is a diagram illustrating certain functions of the central server 15 as well as the interaction of those functions with other participants. As shown in the figure, the central server 15 includes an authenticate application 19, an unlock payment instrument application 16, and a make digital certificate application 17. In addition, the server contains a cryptography functionality 18, for decryption processing, and a database 40. In a preferred embodiment the applications 16, 17 and 19 are implemented in software modules, such a Java servelets, or other software modules appropriate for running on a Web server.

A first preferred method of effecting a secure online transaction in accordance with the present invention and between the participants will be described next. The processes and interactions involved in a typical transaction using the first preferred embodiment of the present invention are illustrated in the flow diagram of FIG. 3 and the sample screen shots of FIGS. 3A-1–3A-4.

Prior to the first illustrated step S1, the customer preferably registers with the central server 15 to obtain a CD-ROM 3 containing the encrypted personal and card data. This is preferably effected by the customer contacting the Web site of the central server over a secure channel and choosing a password/user id, the payment instruments to be used, and other information to be encrypted on the CD-ROM, discussed below in detail. Then, the central server 15 validates the registration as non-fraudulent by, for example, contacting the respective issuing card companies. It should be noted that in the context of this application, the payment instrument issuer refers to any financial institution including but not limited to credit card issuing bank. The customer receives the CD-ROM 3 in the mail. The CD-ROM 3 is preferably mailed to the mailing address directly associated and officially referred to by an existing account with an issuing card company.

The customer completes the registration process by re-authenticating him/herself. The CD-ROM 3 will have to be inserted at this time.

The user then downloads software that forms part of a wallet application. According to one aspect of the present invention, this wallet application preferably is implemented using a thin client running in the customer's computer. In a preferred embodiment, the application functions as a "hybrid" application in that its activation depends on data that resides in the CD-ROM 3 and also data residing on the central server 15.

As is shown in the figure, at step S1, the customer 1 inserts the CD-ROM 3 into the CD-ROM drive of his or her PC. In a preferred embodiment, this step can be triggered by the customer clicking on a wallet application desktop icon created during the initial download and installation of the wallet program. Clicking on the icon would cause the program to request insertion of the CD-ROM to continue. Alternatively, the act of inserting the CD-ROM may automatically start the wallet application running to begin the authentication process of the present invention.

The wallet application preferably performs the following functions: (a) it offers a user (customer) interface allowing the user to login by entering a username and a password; (b) the wallet extracts the encrypted data from the CD-ROM device that has been inserted in the user local CD-ROM or DVD-ROM drive; (c) the wallet application securely connects via the Internet, to the central server 15, and transmits the encrypted data from the user CD-ROM device along with the login information (username and password) obtained from the user in step (a); (d) the wallet application receives back from the central server 15 the result of the authentication process from the server. If the authentication of the user failed, the user is not allowed to proceed with any further use of the wallet. If the authentication of the user is successful, then user is allowed to proceed with the use of the wallet. (e) Once authenticated, the user via the wallet may populate (sometimes automatically) the fields required by the merchant site in submitting the payment instrument for payment authorization. (f) The wallet interface allows the user to manually populate some wallet fields such as the transaction amount, currency type, and possibly some other information (i.e. merchant name, transaction ID), that uniquely identify the transaction for which the payment instrument should be unblocked. (g) The wallet securely connects to the central server to request that the payment instrument be unblocked, for a given time period, for a specific amount, for the transaction whose specificity is established by the data obtained during step f. (h) The wallet also offers a user interface that communicates with the portal information stored on the central server 15 so that the user may display a log of previous transactions made in accordance with the present invention for that payment instrument.

Next will be described the steps by which a transaction charge against a blocked payment instrument (with a card not present transaction) is authorized by the payment instrument owner.

At step S2, a customer authentication procedure is initiated. As will be developed in detail, as a part of this process, the central server decrypts the personal and payment instrument information from the CD-ROM 3. The decrypted personal information is used by the central server 15 to authenticate the identity of the customer 1, after which the decrypted payment instrument information is made available to the customer via the wallet application.

Figure 3:
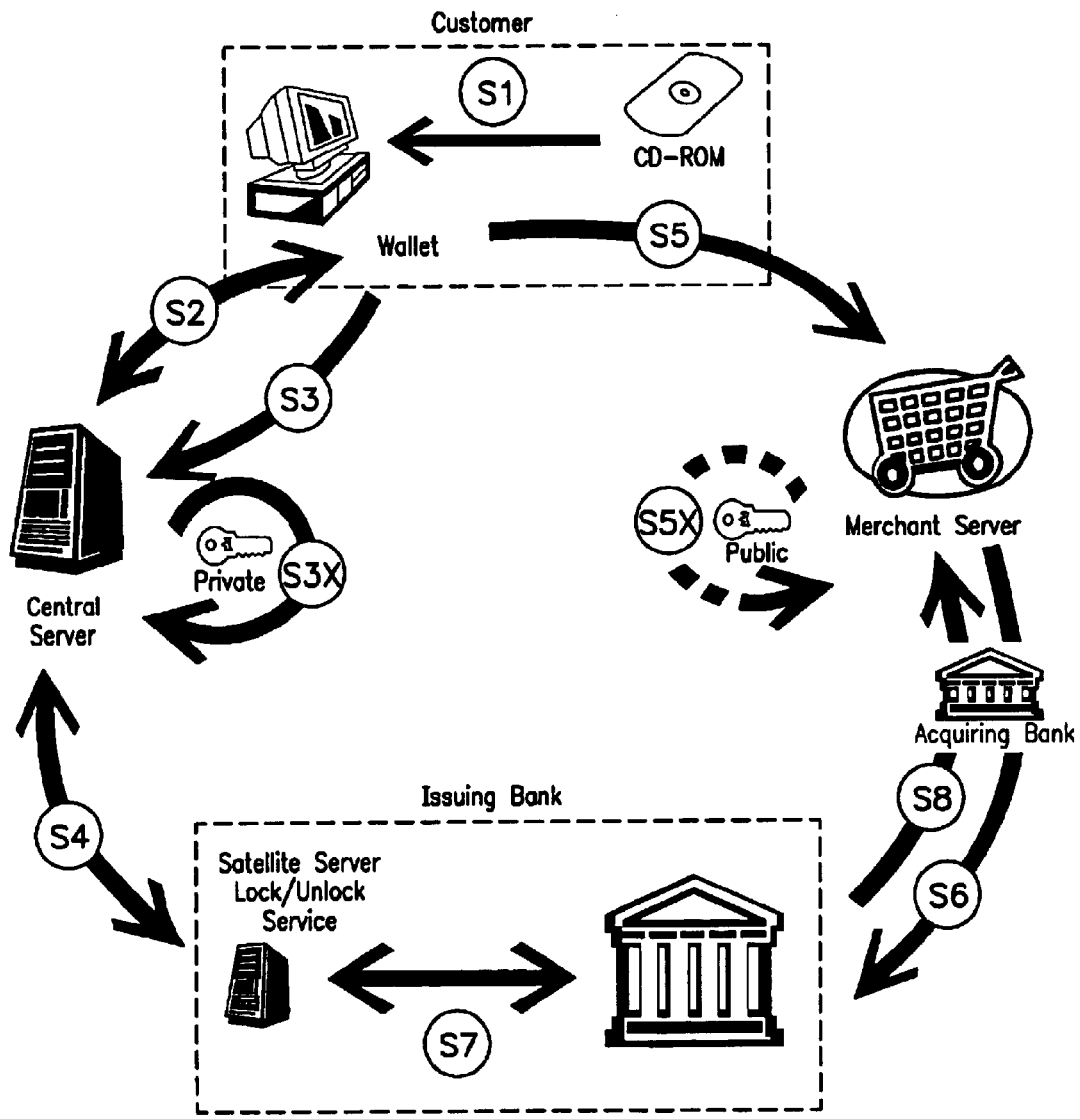
FIG. 3 is a flow diagram illustrating an authentication procedure in accordance with a first embodiment of the present invention.
Figures 1, 3A:
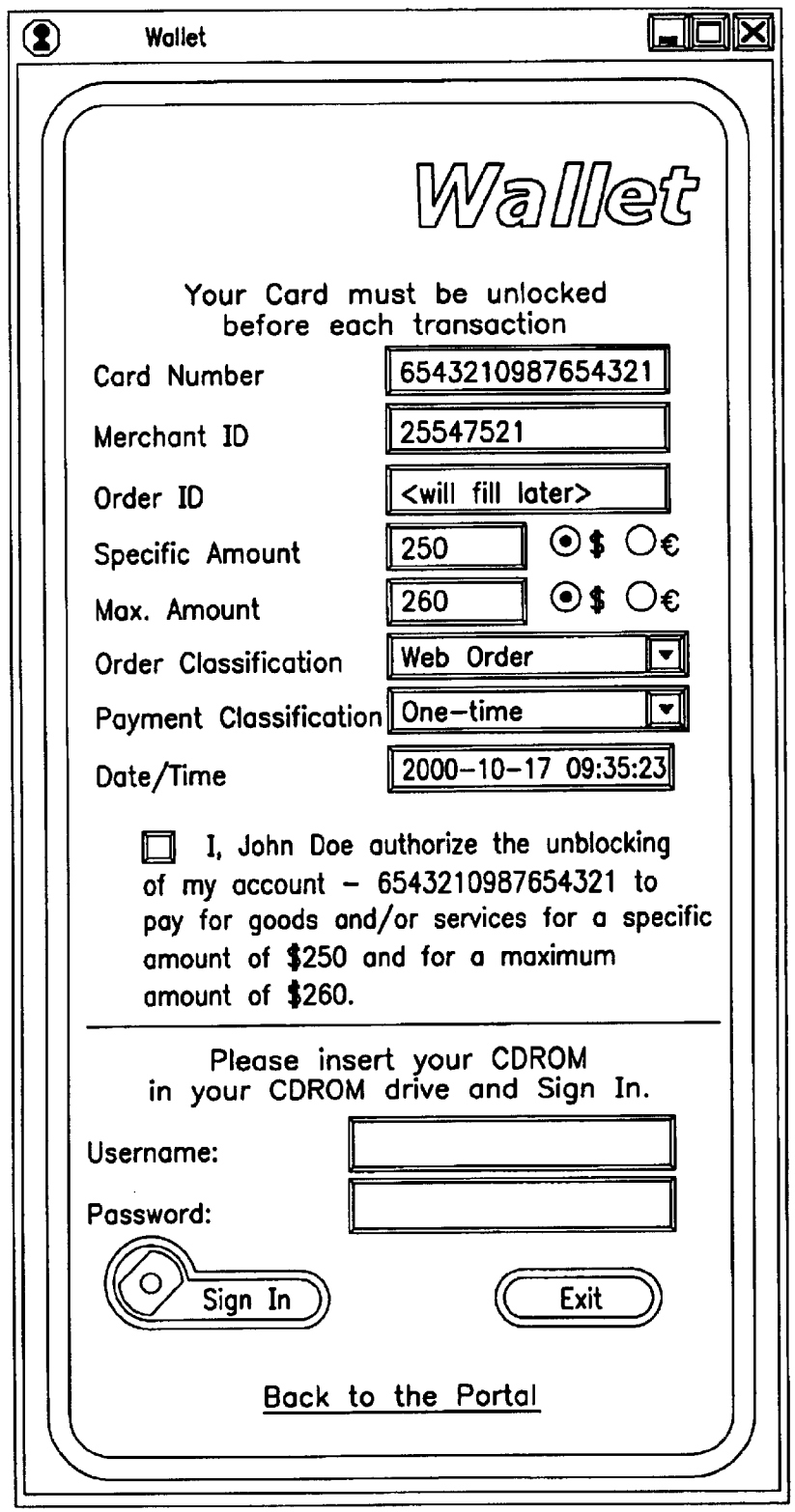
Figures 2, 3A:
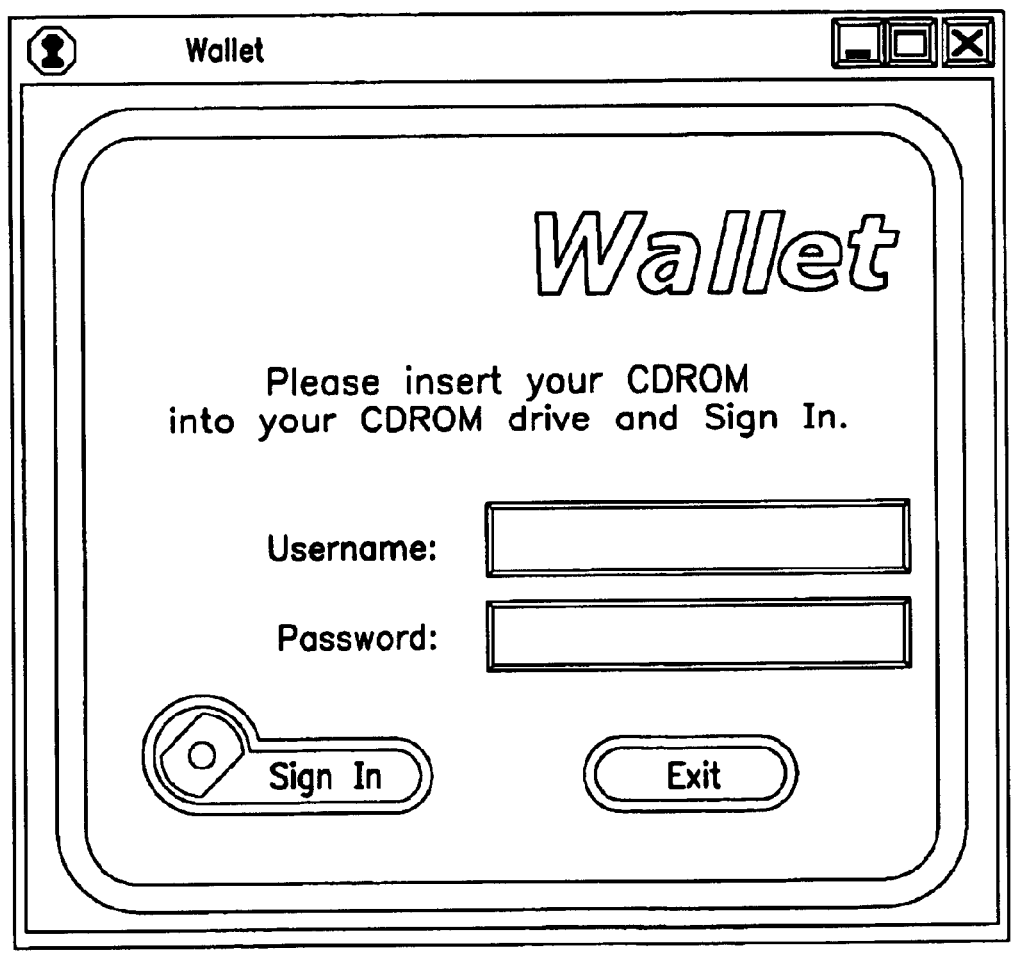
Figures 3, 3A:

To implement step S2, the wallet application of the present invention will most preferably display a graphical user interface (GUI) requiring the customer 1 to enter a username and password—an example of such a screen is shown in FIG. 3A-2. Upon entering a username and password, the entered information is transmitted to the central server 15, together with the corresponding encrypted information on the CD-ROM 3. The central server 15 decrypts the stored user name and password and compares it with what was entered. Preferably, the username is stored in clear text in the central server 15. However, the password preferably is never stored, per se, in the database of the central server 15. Only the "hash" of the original password is stored in the database. A hash algorithm then creates a hash of the password submitted by the user and the server compares the hash from the user and the hash from the database. If the two hashes are the same, then the password is considered valid.

Once the username and password are validated, the central server 15 then compares the CD-ROM ID (similar to a serial number unique to each CD-ROM), transmitted by the user, with the original CD-ROM ID stored in the central server database. "Original CD-ROM ID" means a serial number generated at the time the CD-ROM was "burned" for that particular user which was shipped physically to that user. This original unique CD-ROM ID is stored in the central server database records for each user. In addition, when the original CD-ROM ID is uniquely generated, a digital signature of that CD-ROM ID is also generated and stored in the central server 15 database. As a last security measure, and final step of the matching process, the central server 15 compares the digital signature of the CD-ROM ID transmitted by the user with that of the CD-ROM ID digital signature stored on the central server database.

If this matching is successful, then the payment instrument data residing in the CD-ROM 3 is decrypted, formatted and displayed to the customer in the form of several virtual wallet GUI screens. How many GUI screens depends on the number of payment instruments the user has registered in his/her wallet—an example of such a screen is shown in FIG. 3A-3.

The customer then chooses a payment instrument from among those available in the virtual wallet application. The customer also authorizes a one-time unblocking of the payment instrument for a specific transaction—an example of such a screen is shown in FIG. 3A-3, specifically note the UNLOCK this Credit Card button. To effect the unblocking, the wallet application through its scanning function will retrieve as much data as it can muster from the merchant website online order form. The scanning function utilizes the known ECMLScan standard, which is a well-known standard for online checkout fields. ECML is a universal, open standard for digital wallets and online merchants that facilitates the seamless exchange of payment and order information to support online purchase transactions. ECML, a universal format for online checkout form data fields, was announced in June 1999. ECML provides a simple set of guidelines for web merchants that enables digital wallets from multiple vendors to automate the exchange of information between consumers and merchants. The standard, which is hereby incorporated by reference, can be accessed at http://www.ecml.org. Such data may include order number, Website name or merchant name, specific order total amount, date, time, payment instrument chosen by user, as shown in FIG. 3A-1. This automatic form filling technique of the present invention is a process derived by using the ECML standard. In order to do automatic filling, one must identify one or more fields that are used in an order form. Order forms that are ECML compliant use the same tag names for some fields like total order amount, shipping address, billing address. To program/code an automatic-filler and/or a scanner, patterns are defined for each ECML compliant fields. This pattern is to be a representative subset of what to look for/scan for in an order form to identify a certain field in an order form (i.e. for an email address field, a possible associated pattern could be "mail"). For a targeted field, a match of what is found in the order form to that of the representative pattern is enough to tag this field and data and transfer the value of the field in an electronic wallet to the data corresponding to the field in the order form.

The customer is also allowed to input a maximum amount if he/she wants to allow the purchase to go through if it is less than or equal to the maximum amount but more than the specific order total amount. The maximum order amount is especially helpful in cases where the online merchant does not or cannot provide an exact amount to the buyer, e.g. or merchant cannot give the exact amount of shipping cost or applicable sales tax—an example of such a screen is shown in FIG. 3A-1. The customer should also enter the order classification and payment classification. Order classification can be one of the following: Web order, Mail Order, Telephone Order. Payment classification can be one of the following: pre-order payment, one-time payment, recurring payment. Order classification and Payment Classification are shown in FIG. 3A-1. All of this data will be scanned/gathered and entered via the wallet application. This packet of data to unblock payment will transmitted and stored in the central server 15.

Implementation of the unblocking requires strong authentication of the customer 1. This authorization will be secured by a pin-code/pass-code that the customer will need to enter to unblock his/her payment instrument. The pin-code/passcode preferably will be different for each payment instrument—an example of such a screen is shown in FIG. 3A-1, bottom portion. The authorization receipt stub preferably will contain a statement along the lines of the following:

I, "Name of payment account owner" authorize the unblocking of my account—"Payment Account Number" to pay for goods and/or services ordered from "Merchant ID" for a specific amount of "Order Amount" and for a maximum amount of "Maximum Amount". Merchant Order number is: "Order Number", dated "mm/dd/ccyy", approximate time: "hh:mm:ss". Order Classification: WEB Order Payment Classification: Pre-order Payment Enter Pin-Code/Passcode here: _____

Note that the "Name of payment account owner", the "Payment Account Number", the "mm/dd/ccyy", and the "hh:mm:ss" will be automatically generated by the wallet application and cannot be changed by the customer. Such an authorization receipt stub is shown in FIG. 3A-1. The chosen payment account in the wallet application should correspond to the payment account used with the merchant. The customer can change his or her choice by using a drop-down box that may be provided in the wallet application or by clicking on another payment account, or icon representative thereof, to be unblocked.

At step S3, the wallet application causes the central server to request that the selected payment instrument be unblocked. Upon a valid input of pin-code/pass-code, the central server will store and log the authorization receipt data, which may be encrypted.

Step S3X represents an optional, highly advantageous enhancement in which, the central server 15, using a central server private key, creates a digital signature for the specific unblocking authorization receipt and stores this, which now is a digitally signed unblocking authorization receipt, in database 40 located at the central server 15. In the case of a card transaction, this signature could be used as a virtual signed card receipt, which, using the server's private key, would be digitally signed, so as to insure that it has not been tampered with.

At step S4, The central server 15 then sends a copy of the authorization log receipt/record, that is, the stub filled out in the previous step, to the satellite server 25. The central server 15 waits for confirmation of a successful delivery of this log receipt/record. The transmission of these authorization to unblock receipts will form the basis of a database stored locally within the satellite server 25, installed at or in association with participating issuing bank 20.

At step S5, the decrypted and successfully unblocked payment instrument information is displayed in a GUI presented by the customer's wallet application as "ready to be used" or "successfully unblocked". This unblocked payment instrument information then may be copied to the merchant payment form at the merchant's Web site using a wallet auto-fill function (click-and-fill or drag-and-drop)—an example of such a screen is shown in FIG. 3A-3, specifically note the AUTOFILL the Merchant Page button.

Preferably, merchants can register with the trusted third party administering the central server to obtain the maximum benefits of the present invention. For registered merchants, the digital signature for the payment instrument transaction can also passed to the merchant for verification.

The wallet application of the present invention will work with any online merchant order form. Usage of the secured payment system of the present invention does not require system changes on the part of the merchant. Registered merchants can, at step S5X, authenticate the customer by verifying the payment information digital signature.

At step S6, the merchant server 10 requests its acquiring bank 30 for a payment instrument charge authorization. This request is passed along to the issuing bank 20 over card association network 35.

At step S7, the issuing bank 20's legacy computer system checks, by using a user authorization matching procedure, to determine if the normally blocked payment instrument is now unblocked. If it is, the issuing bank 20 carries on with the normal authorization procedure. An exemplary matching procedure is shown in FIGS. 3B-1–3B-8. In the figures TTP stands for trusted third party.

Before the issuing bank 20 can exercise this authorization matching procedure, the issuing bank's legacy system will determine if:

the card authorization is not an authorization for a charge reversal and the transaction amount is >0 and card authorization is not from a SET transaction and card approval code is '00' (means approved and completed) and card account is blocked All of these can be determined by the issuing bank based on the merchant authorization request packet except for the card account being blocked. The trusted third party will have in its central server 15 and also in satellite server 25, a database/list of accounts that users have registered as blocked.

Again, if all the above conditions are met, the issuing bank 20 will check if there currently is an authorization to unblock the instrument for this specific charge by using a customer authorization matching procedure previously provided by the trusted third party. The procedure allows the generation and storage of registered blocked payment instrument accounts; generation, transmission and storage of authenticated customer authorization receipts to unblock their normally blocked payment instrument; the issuing bank to match merchant payment authorization requests to user generated unblock payment receipts that were transmitted and stored in the satellite server; to mark a match and inform the issuing bank's system of a positive proof authorization to unblock payment by a user; to reconcile and update a user's list of unblock payment receipts to what merchant authorization requests. If an authorization to unblock for this charge has not been provided by the customer 1, the issuing bank 20 will deny the authorization. If an authorization to unblock has been provided by the customer 1, the issuing bank 20 carries out the rest of its normal authorization procedure.

Any search for an authorization log receipt/record will be logged and the central server 15 will receive a message record. These message records will be available for display to the appropriate customer.

The issuing bank goes through its normal authorization procedure, then may use the following procedure to match the payment authorization request with an unblock receipt:

In the following pseudo-code, "attachment A" refers to: VISA International Acquirer Services—External Interface Specification—Second Generation—Authorization Record Formats—EIR 1080 Version 5.8—VISA Public—dated Apr. 1, 1999, which is hereby incorporated by reference. In the code TTP stands for trusted third party.

---

```
Set TTP-match-found-ind = 'true'
If Authorization Transaction Code is not for a "authorization reversal", "debit reversal", "cancel
request", "automatic reversal - direct debit purchase", "automatic reversal - direct debit purchase
return" or "automatic reversal - Interlink direct debit cancel" [4.13] - (see Attach. A, pg. 19 -
indicates transaction reversal)
        GO TO EXIT (no need to check for a TTP Unblock Authorization Receipt)
ELSE
        If fields: Approval code [4.69.1], retrieval reference number [4.69.4],
                OR system trace audit number [4.70.1] is filled (see Attach. A,
                Pages 46-47 - indicates transaction reversal)
            GO TO EXIT (no need to check for a TTP Unblock Authorization Receipt)
        ELSE
            IF Transaction Amount [4.83] (see Attach. A, page 51) is not >0
                GO TO EXIT (indicates no charged amount)
            END
        END
END
If Authorization Response Code [4.66] (see Attach. A, pages 44-45 - means approved and
complete) is = '00'
    If card account is found in the TTP-blocked-accounts list
        If Group III Version Number = 009 [4.38] (see Attach. A, page 35 - means that this is
        SET)
                Perform TTP-Notify-Card-Owner
                GO TO EXIT
        END
        If card account is a ghost account (means card-present transactions are not allowed)
                If Authorization Transaction Code [4.13] (see Attach. A, page 19 - means Card
        Not
                        Present)) is in ['56','66','86'] and Cardholder Identification
        Code*
                        [4.22] (see Attach. A, page 23) = 'N' or '7' or '8'
                Perform TTP-Search-Unblock-Authorization
                Perform TTP-Notify-Card-Owner
```

-continued

```
            ELSE (Means that this is a Card-Present authorization against a Ghost Account)
                    Set TTP-match-found-ind = 'false'
                    (Reject this payment authorization request)
                    Perform TTP-Notify-Card-Owner
            End
        ELSE (Means that this is not a Ghost Account but a 'real' card account)
            If Authorization Transaction Code [4.13] (see Attach. A,
                    Page 19 - means Card Not Present) is = '56' or '66' or
                '86'
                    and Cardholder Identification Code* [4.22] (see
                    Attach. A,
                    Page 23) = 'N' or '7' or '8'
                    Perform TTP-Search-Unblock-Authorization
                    Perform TTP-Notify-Card-Owner
            End
        End
    End
End.
If TTP-match-found-ind = 'false'
    Issuing Bank must reject this payment Authorization transaction
End.
EXIT.
*Cardholder Identification Code
N - Authorization includes Address Verification Data, CPS/Card Not Present or
    Electronic Commerce
7 - Non-Authenticated Security transaction, such as a channel-encrypted
    transaction (e.g. SSL, DES or RSA)
8 - Non-Secure Electronic Commerce Transaction
Set TTP-match-found-ind = 'false'
Get all unblock-log-authorization records where unblock-rec-match not = 'y'
Sort all found unblock-log-authorization records based on unblock-order-max-amt ascending,
unblock-spec- amt ascending
Perform for every unblock-log-authorization record found:
    If Unblock-order-max-amt = OR > Transaction Amount [4.83]
            (see Attach. A, pg. 51)
        PERFORM TTP-Unblock-Authorization-Found
        Set TTP-match-found-ind = 'true'
    End
End-Perform.
Update database with this unblock-log-authorization record's unblock-rec-match = 'y'
Send the update to the main TTP server.
Generate a log message.
Save it in the local TTP Server
Send the same log message to the TTP Main Server.
```

At step S8, the issuing bank 20 returns the payment instrument charge authorization to the merchant server 10 via acquiring bank 30. This portion of the process need not be changed from the corresponding steps in normal authorization.

Usage of the secured payment system of the present invention is not limited to issuing card companies. The system can also be used by banks, merchants, other businesses and individuals that could improve their processes by checking for a customer's payment authorization.

For example, such parties can verify, in case of a dispute or charge-back, that the transaction information (of the virtual receipt—previously signed by the central server) has indeed been signed by the central server and has not been tampered with. Examples of such parties are online travel agencies, payment engine processors like Clear-Commerce, an individual selling goods in an online auction, such as EBAY.

Figures 3, 3A, 4:
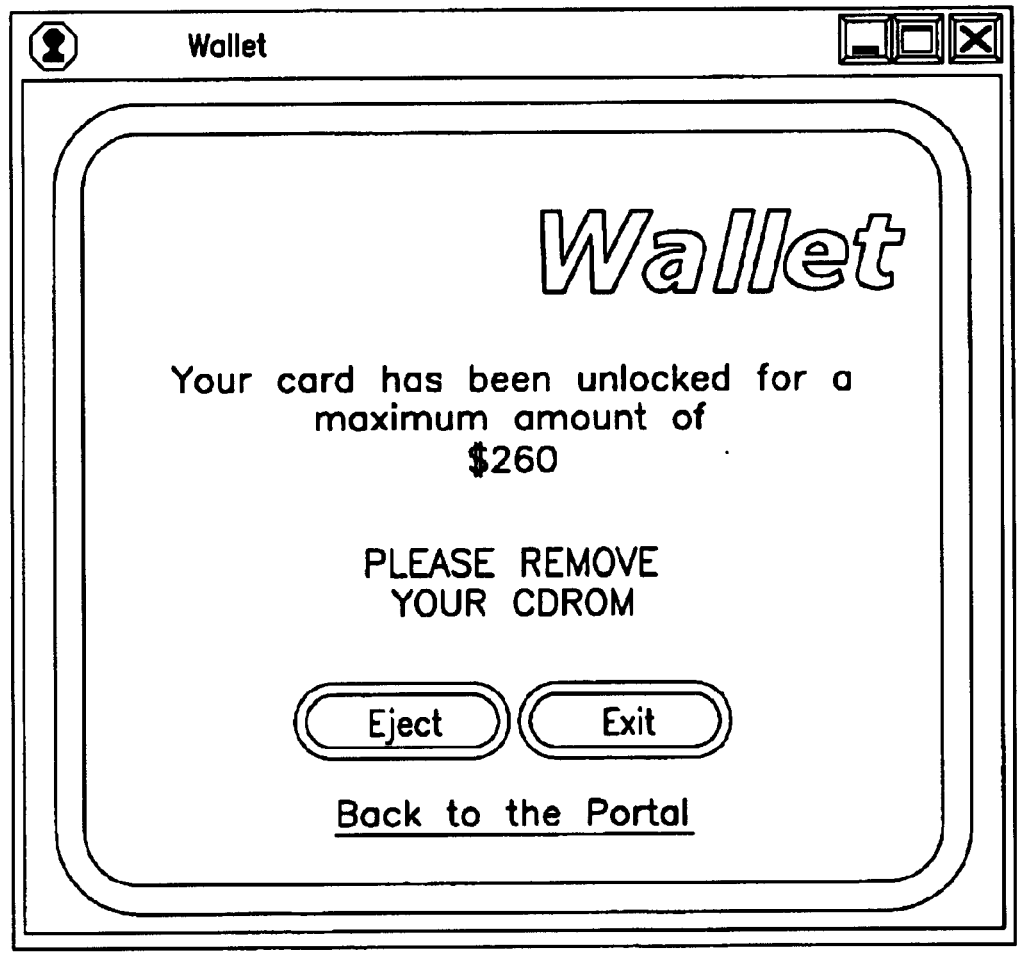
Figure 4:
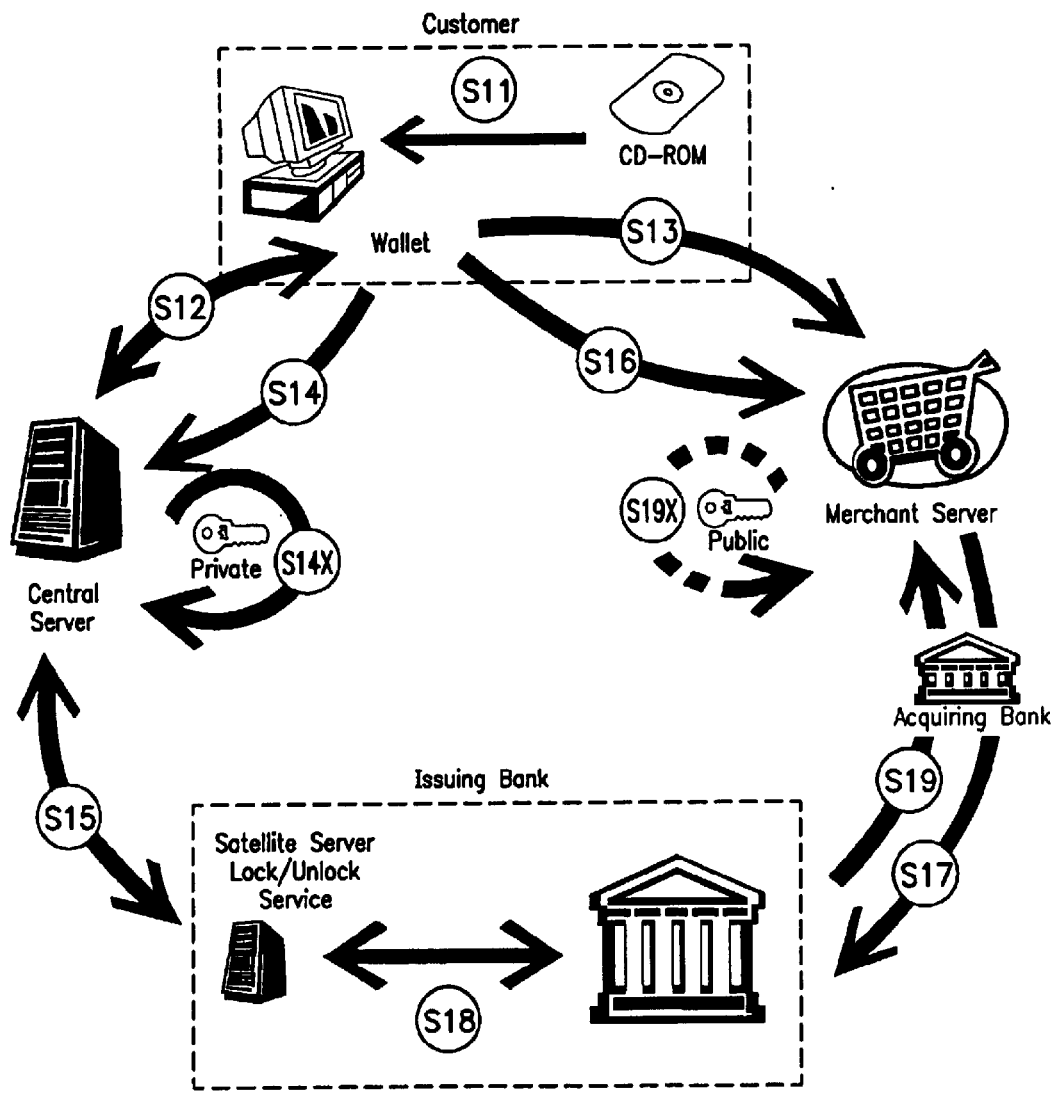

An alternative sequence of operations for a second embodiment of the present invention will next be described with reference to FIG. 4.

The main difference between the first embodiment and the second is the timing of events. In the previously described embodiment, the customer chooses the payment instrument, issues an authorization to unblock payment instrument, waits for central server to successfully generate and transmit this authorization to unblock receipt, then auto-fills the merchant's order form with the unblocked payment instrument information and other data such as billing address and shipping address, then clicks the final pay button in the merchant's order form to complete his/her order with the merchant. In the second embodiment: the user chooses the payment instrument, auto-fills the merchant's order form with the chosen payment instrument information and other data such as billing address and shipping address, then issues an authorization to unblock payment instrument, waits for central server to successfully generate and transmit this authorization to unblock receipt, then clicks on the final pay button in the merchant's order form to complete his/her order with the merchant.

As in the previous embodiment, at step S11 the customer inserts the CD-ROM into the CD-ROM drive of the PC and launches the wallet application—an example of such a screen is shown in FIG. 3A-2. In step S12, the user is authenticated by the central server 15 just as in the first embodiment. Payment instrument information is decrypted. The decrypted payment instrument information is displayed to the user via the wallet application—an example of such a screen is shown in FIG. 3A-3.

In step S13, the decrypted payment instrument information is "posted" in the user's virtual wallet as "ready to be used". Note that in this embodiment the payment instrument can be used by the user to auto-fill an online merchant's order form although the unblocking has not been done. The payment instrument information may then be copied to the merchant payment form using a wallet application auto-fill (click-and-fill or drag-and-drop) function—an example of such a screen is shown in FIG. 3A-3, see AUTOFILL the Merchant Page button. The unlocking procedure is started once the user clicks on the UNLOCK this Credit Card button—an example of such a screen is shown in FIG. 3A-3.

The wallet application executes a communication with the central server 15 to request that the selected payment instrument be unblocked—an example of such a screen is shown in FIG. 3A-1. At step S14X, a digital signature for the payment instrument transaction is generated by the central server 15 and stored in the database 40. At step S15, the central server 15 sends a copy of this unblock payment receipt to the satellite server 25, associated with or installed at the issuing bank 20. Once the payment instrument has been successfully unblocked, at step S16, the customer completes his/her order with the merchant by transmitting the filled-out order form to the merchant's system. For registered merchants, the payment transaction data and the digital signature from step S14X of the payment instrument transaction is also passed to the merchant for later verification.

At step S17, the payment instrument charge authorization is requested by the merchant server 10. This request is sent to the issuing bank 20, through the acquiring bank 30, just as in the first embodiment. At step S18, the issuing bank 20's legacy computer system checks, by using a proprietary user authorization matching procedure provided by the trusted third party to determine if the normally blocked payment instrument is now unblocked. This is the same as the corresponding process discussed in the previous embodiment. If it is, the issuing bank 20 carries on with the rest of its normal authorization procedure and, at step S19, the issuing bank 20 returns the payment instrument charge authorization to the merchant. At step S19X, registered merchants can verify off-line the digital signature of the payment information.

A significant advantage of the verification of the payment transaction digital signature is for the merchant to insure that the instrument holder (the customer) has been strongly authenticated as a registered customer and that the payment transaction information has not been tampered with, so that the payment instrument holder may not repudiate the transaction (or dispute the transaction in bad faith). The verification process of the payment transaction digital signature, by the merchant, implies that the following information has been recorded both on the central server and on the merchant computer: (a) the authorization code, which is a unique number identifying the transaction, (b) the hash of the customer credit card used for the transaction (preferably using the SHA algorithm), (c) The date/time stamp of the transaction, (d) a signature of the hash of the preceding information (SHA then RSA algorithms).

The above exemplary transactions respectively illustrating the first and second embodiments, utilized a preferred hybrid wallet application. However, the above descriptions of that application should not be understood as a limitation. The strong authentication can be achieved by encrypting sensitive data in the central server, to effect server-based secure electronic wallet functionality. This aspect of the invention is described as follows.

When the customer registers at the central server, preferably he/she can choose a CD-ROM based wallet described above, or a server-based wallet. Whatever his choice is, the preference is noted and stored in the central server. Registration is done through an interface application that can be accessed via the main trusted third party's portal application. The trusted third party's portal preferably will contain a user registration interface, user administrative interface, list of affiliated banks, issuing card companies, list of online stores (affiliated or not), a user account interface that will show user activity and other transactions conducted, like a ledger. After a successful and validated registration, the user can then download the wallet application. This download process will look up the preference and, based on user preference, the download process will store this preference via a cookie in the PC of the customer. This information in the cookie will be used during customer authentication to automatically determine the security level chosen (hybrid wallet or server-based wallet) by the customer. If the cookie information shows that user using a user-id chose a hybrid wallet, this customer will be automatically prompted to load their CD-ROM into the CD-ROM loading tray as discussed above. If the customer chose a server-based wallet, all the customer needs to do is to enter his/her user-id and password via the wallet application. For this "server-based" wallet, payment instrument data, shipping addresses and billing addresses are stored in the central server. Payment instrument information will be stored in an encrypted fashion. In this server-based wallet version, the user authenticates by giving his username and password. The server searches for a registered customer having the same username and password in its database. If there is a match, the customer is authenticated. The server then decrypts the payment instrument information and sends back this data and other data pertaining to billing addresses and shipping addresses to the wallet application. The auto-fill and drag-and-drop procedures are identical to the ones used for the CD-ROM based wallet. The unlocking procedure will also be similar, except that the user is authenticated using his username and password only. The authentication information normally stored on the CD-ROM are not used.

If the customer chose a server-based wallet, the registration process would differ from that described above in that a confirmation notice with a unique id will be issued and mailed to the mailing address directly associated and officially referred to by and existing account with an Issuing Card Company. A customer that chose a server-based wallet completes registration by inputting the unique id from the confirmation notice.

In either of the above embodiments, a potential customer may also subscribe to apply the block/unblock feature to a payment instrument only for as long as the issuing bank for that payment instrument has an operating agreement with the trusted third party.

The above embodiments are for purposes of illustration only and are not to be construed as limitations. For example, the portable storage media of the present invention is not limited to a CD-ROM but can also make use of single or multiple layer DVD-ROMS.

Further, access to an electronic wallet in accordance with the present invention is not limited to an online/Web interface model. It is also possible, for example, to utilize a process by which access can be obtained via the telephone.

In such a system, a customer can call the trusted third party. Strong authentication will be done by requiring the entry of the following: A numeric user identification (possibly but not limited to social security number) and a numeric pin-code. Upon successful authentication, the following exemplary voice menu can be presented:

Dial 1 to update your payment instrument profile
Dial 2 to issue a request to unblock payment
Dial 3 to update a request to unblock payment Dial 4 to delete a request to unblock payment Dial 5 to check your unused authorization balance Dial 6 to check for used authorization receipts Menu choice 1: will allow a registered customer to change the profile of his/her registered payment instrument. Specifically, the registered payment instrument is blocked, and the customer can unblock all authorizations against this payment instrument by using this menu choice.

Menu choice 2: will allow the registered customer to issue a request to unblock payment. The customer will be prompted to key in payment instrument account number, maximum unblock amount, specific unblock amount, order id/no (if known), order classification (web order, telephone order, mail order) and payment classification (one time payment, recurring payment, split payment).

Menu choice 3: will allow the registered customer to update a request to unblock payment. The customer will hear a list of unused/unmatched unblock authorization receipts, and can choose from the list heard which one he/she wants to update. The customer can change the maximum unblock amount, specific unblock amount, order id/no, order classification and/or payment classification.

Menu choice 4: will allow the registered customer to delete a request to unblock payment. The customer will hear a list of unused/unmatched unblock authorization receipts, and can choose from the list heard which one he/she wants to delete.

Menu choice 5: will allow the registered customer to check for unused/unmatched unblock authorization receipts and balance. The customer will hear a list of unused/unmatched unblock authorization receipts (last 5 and possibly more) and can also ask for a general balance (amount) of unused unblock authorization receipts.

Menu choice 6: will allow the registered customer to check for used/matched unblock authorization receipts. The customer will hear a list of used/matched unblock authorization receipts (last 5 and possibly more).

Menu choices 1 through 4 may require a second access code to apply a higher level of security.

It should not be construed that the process of authentication of the present invention is limited to the use of username and password. In view of the vast amount of storage space available in a CD-ROM or DVD-ROM, biometric data such as voice, fingerprint, retina-scan, can easily be stored to provide highly secure authentication, well within the scope of the present invention.

Further, the method by which a payment instrument owner of a blocked account may issue an authorization to unblock payment for a specific transaction also is not limited to an online/Web interface model. Such unblocking may, for example, be effected via the telephone, with appropriate verbal or touch-tone authorization steps. Moreover, while the description of step S5X above is described in terms of an online process, that step can be effected off-line as well. The method by which the vendor, merchant, bank, issuing card company, a business or an individual may check for an authorization to unblock a payment instrument is not limited to an online/web, real-time electronic interface. This function may be effected by means of a process using the telephone.

In the telephone manifestation of the present invention, a participating, registered vendor, merchant, bank, or individual can call the trusted third party. Strong authentication will be done by requiring the entry of the following: A numeric user identification (possibly but not limited to social security number or EIN number) and a numeric pin-code. Upon successful authentication, the following voice menu can be presented:

Dial 1 to match a merchant payment request to a registered customer's payment authorization Dial 2 to wait for Customer Service (live person)

Menu choice 1: will allow registered party to key in their merchant number, order number, order amount, date of order, payment instrument account number, payment classification, order classification. The trusted third party will match this to a registered customer's list of unused/unmatched authorization receipts. The trusted third party will prompt other registered party (vendor) if a match was found (or not found). Registered party may request to 'use' a matching unblock payment receipt. The trusted third party will update the registered customer's list of authorization receipts and notify the registered customer via email or voicemail.

An advantageous variation would require a secondary access code for Menu choice 1 to apply a higher level of security.

It also should be emphasized that the blocking and unblocking process of the present invention is not limited to credit cards. The same process can be applied to other Payment Instruments such as debit cards, checking account, virtual bank accounts, gift certificates, privately issued or loyalty accounts.

Moreover, the secured payment system of the present invention is not limited to use with online/Internet merchants. It can also be used for other direct mail merchants, such as mail order or telephone order merchants. Nor do the benefits of the secured payment system of the present invention accrue only to issuing card companies. The secured payment system can also be utilized by banks, merchants, other businesses and individuals that would have a compelling reason to check for payment authorization. Individuals—such as persons doing payment transactions (receiving or sending payment) via P2P (peer-to-peer also known as person-to-person) payment systems.

These other parties can use the secured payment system of the present invention to verify, in case of a dispute or charge-back, that the transaction information (of the virtual receipt), and which has been signed by the central server, has in fact been signed by the central server and has not been tampered with.

These other parties also may access the technique of the present invention on a non real-time or off-line basis. For example, this would allow a merchant to provide documentation in the case of a disputed/repudiated, i.e. charge back, transaction.

Other parties may access the trusted third party system online or on a batch mode or via telephone.

Real Time or Online:

Other party must be registered and allowed access to the trusted third party. Other party can key in payment instrument account number, merchant id, order number, authorized amount, authorization code, date authorized and the trusted third party will searched for a matched/used signed authorization receipt. If found, the trusted third party will display the details to the other registered party.

Batch Mode:

Other party must be registered and allowed access to the trusted third party. Other party can fill an inquiry data stream. This data stream must include (for each inquiry request): payment instrument account number, merchant id, order number, authorized amount, authorization code, date authorized. Other party can transmit to the trusted third party via FTP (file transfer protocol) using a secured line. The trusted third party will process each inquiry request in each file by looking for matching/used signed authorization receipt or receipts, generate detail response records for each inquiry request, format the responses in a file. The trusted third party will then transmit the file back to the other registered party via FTP.

Telephone:

Other registered party can call the trusted third party. The trusted third party will prompt registered other party to key in the following: payment instrument account number, merchant identification, order number, authorized amount, authorization code, date authorized. The trusted third party will process this inquiry by looking for a matched/used signed authorization receipt. The trusted third party will inform other registered parties if match was found (or not found). The other registered party may request for a confirmation from the trusted third party via fax.

It also will be appreciated that the present invention is not limited to the use of VISA's Standard External Interface Specification. The specific routine set forth above describing data fields in VISA's standard authorization records is purely exemplary and should not be construed as a limitation. The technique of the present invention is quite flexible and can be easily modified to work with any bank or issuing card company to provide them with the application stub, access to the central server and the satellite server to check for authorization and to unblock receipts/records.

The hybrid wallet application and strong authentication of owners of payment instruments as described above advantageously eliminates the high cost of deploying smart chip-based payment instruments for online shopping.

Internet-based payment instruments do not fill the need for a secured method of paying for Mail Orders or Telephone Orders. The technique of the present invention fills the need for a secured method of paying for mail orders or telephone Orders with the use of its internet-based wallet and telephone wallet technique (previously described) and the block/unblock techniques described above.

The technique of the present invention advantageously does not require any changes to a merchant's system and provides participating merchants with documentation in the case of a disputed/repudiated transaction. This helps merchants minimize losses arising from charge-backs. Verification of authorizations is done with the usage of the server electronic signature as outlined above.

Moreover, the Block/Unblock technique of the present invention provides ultimate control to the payment instrument owner over the use of his or her payment instruments. Further, while known single-use card numbers provide privacy, they do not provide real security as the real card number can be stolen and used by another person. Ghost accounts may carry a pseudo-name, whereas single-use card numbers always carry the real name of the payment instrument owner. The technique of the present invention with the combined use of ghost account numbers will provide the user with increased control over the use of his or her payment instruments, as well as increased privacy and security.

Further, the above-mentioned notification of payment instrument owners of requested payment authorizations will breed confidence in the usage of their payment instruments in online, mail order, or telephone order shopping environments, in short, any non face to face payment instrument transaction.

Moreover, the ability to block and unblock payment instruments engendered by the present invention will eliminate the value of hacked database. Thus, there will be less motivation for hackers to steal data from a merchant's databases. This will minimize cyber-crime associated to theft of payment instrument information.

A variation on the above techniques is to allow a payment instrument holder to give access to a payment instrument to his or her family members or other associates, such as co-workers or employees. Access will be controlled and administered by the main payment instrument owner. An even more preferred implementation gives the payment instrument owner the ability to set different types of limits such as (but not limited to):

$ indirect control/access to payment usage limit the registered customer may limit the usage of his/her payment instrument on a per usage basis. For example, a registered customer may want to block any authorization for payment from a card-not-present transaction that carries an amount over $300.00.

Or a registered customer may want to block any authorization for payment that requests for an amount over $25.00. Any request for payment from a card-not-present transaction that carries an amount equal to or less than $25.00 should not be blocked.

For an account that allows a family or group access, the main wallet administrator may impose a no more than $XX amount for an authorized user for his/her wallet. For example, I allow my daughter to use my wallet and I am my wallet administrator. I can key a usage limit based on an amount that I permit my daughter to use. The interface can be as follows:

Jane Smith—wallet administrator Jennifer Smith—allowed user Access limit beginning Feb. 1, 2001—$150.00, expires Mar. 1, 2001

Without the access limit given to Jennifer Smith, Jennifer will not be able to issue an authorization to unblock payment instrument in their group wallet Site exceptions (disallow porn-sites, etc.) based on Merchant SIC code or based on website address gathered and stored by the trusted third party

SPECIFIC EXAMPLE

For an account that allows a family or group access, the main wallet administrator may impose a parental guidance/limit on an authorized user for his/her wallet. For example, I allow my son to use my wallet and I am my wallet administrator. I can key a usage limit based on the kind of service/website that I permit my son to purchase from. The interface can be as follows:

Jane Smith—wallet administrator John Smith—allowed user Access limit—minor, do not allow purchase for any known adult site/merchant With the access limit given to John Smith, John will not be able to buy or transact anything from websites that are known to be porn-sites/adult-sites.

Geographic locations—in the case of card-present transactions

SPECIFIC EXAMPLE

I travel only twice a year. I stay in one country for an extended period of time. I am a registered customer. I can limit card-present transactions against my payment instrument only to originate only from merchants in the U.S. Card-present transactions originating from anywhere outside of the United States will then be denied/blocked.

Date and time of payment authorizations

SPECIFIC EXAMPLE

I am leaving for vacation tomorrow. I will be going to a place where I know I will not be using my wallet and I know that I will not be doing card-not-present transactions for a month. I can log on to my CDCK wallet and block the usage or access to my wallet account for a period of one month starting tomorrow.

What is claimed is:

1. A method of protecting a payment instrument in non-face-to-face transactions, the payment instrument being issued by an issuing entity and associated with an authorized instrument holder, the authorized instrument holder being subject to authentication by a trusted third party with whom the payment instrument holder has previously registered, the method comprising:

the authorized instrument holder communicating with the issuing entity to block, on a default basis, authorization of the payment instrument for non-face-to-face transactions;

prior to a non-face-to-face transaction, the authorized instrument holder communicating with the trusted third party to subject him or herself to authentication and to request that the payment instrument be unblocked for non-face-to-face transactions; and the trusted third party authenticating the authorized instrument holder, and if the authentication result is positive, communicating with the issuing entity to store the request to unblock the payment instrument for non-face-to-face transactions.

2. A method according to claim 1, wherein, the issuing entity retrieves and enforces the unblocking request from the trusted third party, and the non-face-to-face transaction is a transaction with a merchant and further comprising the step of the issuing entity forwarding a payment authorization response to the merchant in response to receipt of a request for authorization from the merchant.

3. A method according to claim 1, wherein the customer has previously blocked use of the payment instrument for non-face-to-face transactions on a default basis and the trusted third party is further adapted to receive a request from the customer to unblock use of the payment instrument for non-face-to-face transactions, the method further comprising the steps of:

using a satellite computer system, associated with the trusted third party and located in proximity to an issuing entity of the payment instrument, the satellite computer system being adapted to communicate with the issuing entity to store the unblock request for the payment instrument account for non-face-to-face transactions in response to a request from the trusted third party computer system to unblock the payment instrument for non-face-to-face transactions, the request being made by the trusted third party computer system upon successful authentication by the trusted third party computer system of the identity of the customer as an authorized user of the payment instrument.

4. A method according to claim 3, wherein the customer has previously blocked use of the payment instrument only in non-face-to-face transactions.

5. A method of protecting a payment instrument in non-face-to-face transactions, the payment instrument being issued by an issuing entity and associated with an authorized instrument holder, the authorized instrument holder being subject to authentication by an authentication function, the method comprising:

the authorized instrument holder communicating with the issuing entity to block, on a default basis, authorization of the payment instrument for non-face-to-face transactions;

prior to a non-face-to-face transaction, the authorized instrument holder communicating with an authentication function to subject him or herself to authentication and to request that the payment instrument be unblocked for non-face-to-face transactions; and the authentication function authenticating the authorized instrument holder, and if the authentication result is positive, causing the issuing entity to store the request to unblock the payment instrument for non-face-to-face transactions.

6. A method of protecting a payment instrument used in transactions, the payment instrument being issued by an issuing entity and associated with an authorized instrument holder, the authorized instrument holder being subject to authentication by an authentication function, the method comprising:

blocking the authorization for a payment instrument, on a default basis, by the issuing entity;

communicating by the authorized instrument holder, prior to a transaction or multiple transactions, with an authentication function to subject the authorized instrument holder to authentication and to request that the payment instrument be unblocked for future payment authorizations; and authenticating the authorized instrument holder, and if the authentication result is positive, causing the issuing entity to store the request to unblock the payment instrument for the authorization of payments for the transaction or transactions.

7. A method of claim 6 further comprising a set of conditions set by the instrument holder after successful authentication which must be met before the issuer authorizes the payment instrument for a particular transaction or series of transactions, the conditions being one or more of the following: the transactions are equal to or less than a certain amount total, either individually or collectively; the transaction(s) are in a geographic location or locations where the transaction(s) may take place; the transaction(s) take place on a date that is after a set start date and before a set end date; the transaction(s) are such that the card must be present; the transaction(s) are such that the card is not present.

8. A method of claim 6 further comprising the authorized instrument holder communicating with the authentication function through one of the following methods: by using an application program running locally on the authorized instrument holder's computer or portable computing device which communicates with the authentication function over a network or dial-up connection; by using an application program accessible through the web; by using an application program in conjunction with a storage medium in the possession of the authorized instrument holder, the storage medium storing encrypted personal information; by using the telephone to dial into an automated response system; by contacting a call center or customer service center.

9. A method of claim 6 further comprising notification to the authorized instrument holder of the current status of the payment instrument using one or more of the following means: email; voice notification through a telephone line; a short message signal sent to a pager or mobile phone; through an application program running locally on the authorized instrument holder's computer or portable computing device; through an application program accessible through the web; by contact with a call center or customer service center.

10. A method of claim 6 further comprising a means for the payment instrument holder or a merchant involved in a transaction to view the transaction details including the authorization status of the payment instrument at the time of the transaction.

* * * * *